United States Patent
Bottan et al.

(10) Patent No.: US 10,831,382 B2
(45) Date of Patent: Nov. 10, 2020

(54) PREVENT DISK HARDWARE FAILURE FOR CLOUD APPLICATIONS

(71) Applicant: International Business Machines Corporation, Armonk, NY (US)

(72) Inventors: Pier F. Bottan, Cappella Maggiore (IT); Francesco M. Carteri, Rome (IT); Giorgio Corsetti, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 15/826,602

(22) Filed: Nov. 29, 2017

(65) Prior Publication Data

US 2019/0163379 A1    May 30, 2019

(51) Int. Cl.
*G06F 3/06* (2006.01)

(52) U.S. Cl.
CPC ............ *G06F 3/0619* (2013.01); *G06F 3/065* (2013.01); *G06F 3/0629* (2013.01); *G06F 3/0664* (2013.01); *G06F 3/0689* (2013.01)

(58) Field of Classification Search
CPC ...... G06F 3/0619; G06F 3/0629; G06F 3/065; G06F 3/0664; G06F 3/0689
See application file for complete search history.

(56) References Cited

U.S. PATENT DOCUMENTS

| | | | |
|---|---|---|---|
| 7,373,559 B2 | 5/2008 | Guha | |
| 8,406,096 B1 | 3/2013 | Edling et al. | |
| 8,819,383 B1 * | 8/2014 | Jobanputra | G06F 3/0613 711/154 |
| 9,229,796 B1 * | 1/2016 | Ma | G06F 11/008 |
| 2005/0044313 A1 * | 2/2005 | Amemiya | G06F 3/0605 711/114 |

(Continued)

FOREIGN PATENT DOCUMENTS

WO    2015009280 A1    1/2015

OTHER PUBLICATIONS

Mirela Botezatu, et al., Predicting Disk Replacement towards Reliable Data Centers, in Proceedings of 22nd Annual ACM SIGKDD International Conference on Knowledge Discovery and Data Mining, Aug. 13, 2016, pp. 39-48, Association for Computing Machinery, New York, NY, USA.

*Primary Examiner* — Nanci N Wong
(74) *Attorney, Agent, or Firm* — Christopher M. Pignato

(57) ABSTRACT

An interruption of services for a multi-tier application is avoided based on a probability of a disk failure. A criticality factor value is assigned to a component of the multi-tier application. A disk failure probability value is predicted for a disk drive of a disk volume accessed by the component. If the disk failure probability value is above a predefined probability value and the assigned criticality factor value of the component is below a predefined criticality threshold value for the disk drive, the disk drive is marked to be exchanged during a next maintenance window. Alternatively, if the disk failure probability value is above the predefined probability value and the assigned criticality factor value of the component is equal to or above the predefined criticality threshold value, an immediate full copy of data of the disk drive is performed to a newly instantiated disk volume on another disk drive.

19 Claims, 5 Drawing Sheets

(56) References Cited

U.S. PATENT DOCUMENTS

| | | | |
|---|---|---|---|
| 2005/0283655 A1* | 12/2005 | Ashmore | G06F 11/004 714/6.32 |
| 2008/0198950 A1* | 8/2008 | Suyama | G06F 11/0751 375/340 |
| 2009/0106602 A1* | 4/2009 | Piszczek | G06F 11/008 714/42 |
| 2009/0271657 A1 | 10/2009 | McCombs et al. | |
| 2010/0324945 A1* | 12/2010 | Hessing | G06Q 40/06 705/4 |
| 2013/0227345 A1* | 8/2013 | Gadekar | G06F 11/1092 714/6.22 |
| 2015/0067410 A1 | 3/2015 | Kumar et al. | |
| 2015/0074452 A1* | 3/2015 | Tsukahara | G06F 3/0619 714/6.23 |
| 2015/0169445 A1* | 6/2015 | Dell | G06F 12/0646 711/5 |
| 2015/0281015 A1 | 10/2015 | Griffith et al. | |
| 2016/0070490 A1* | 3/2016 | Koarashi | G06F 11/14 711/114 |
| 2016/0179381 A1* | 6/2016 | Paes | G06F 3/0604 711/103 |
| 2016/0203027 A1* | 7/2016 | Challa | G06F 9/5038 718/1 |
| 2018/0165166 A1* | 6/2018 | Wang | G06F 11/203 |

\* cited by examiner

100

102 assigning a criticality factor value 104 predicting a disk failure probability 106 marking the disk to be exchanged 108 performing an immediate full copy

PREVENT DISK HARDWARE FAILURE FOR CLOUD APPLICATIONS

BACKGROUND

The invention relates generally to a method for avoiding an interruption of services for a multi-tier application, and more specifically, to a method for avoiding an interruption of services for a multi-tier application based on a probability of a disk failure. The invention relates further to a related system for avoiding an interruption of services and a computer program product.

Although in-memory computing is on the rise, traditional spinning disk storage systems continue to be an important component in data centers. This applies also to large data centers—in-house or cloud-based—offering services to other services/applications and/or users. Thus, increasing the reliability of disk systems and consequently increasing the reliability of cloud-based services remain an important objective of data center operations.

In general, it is not possible to predict whether any particular nodes of a deployed network of computing, network, and storage systems may fail because of a disk failure. In complex deployment environments, configuring some nodes with high-availability may be an approach to avoid out-of-service situations for a specific server core for a software agent running on a node. However, with complex deployment environments, it is technically not always possible or financially feasible to configure all critical nodes in a high-availability mode at the same time because of costs, time, and/or space restrictions.

SUMMARY

According to one aspect of the present invention, a method for avoiding an interruption of services for a multi-tier application based on a probability of a disk failure may be provided. The method may include assigning a criticality factor value to at least one component of the multi-tier application and predicting, by a prediction analyzer, a disk failure probability value for a disk drive of a disk volume accessed by the component.

The method may further include, in response to the disk failure probability value being above a predefined probability value for the disk drive of the disk volume accessed by the component and the assigned criticality factor value of the component being below a predefined criticality threshold value, by a proactive replacer, marking the disk drive of the disk volume accessed by the component to be exchanged with another disk volume on another disk drive during a future maintenance cycle; and in response to the disk failure probability value being above the predefined probability value for the disk drive of the disk volume accessed by the component and the assigned criticality factor value of the component being equal to or above the predefined criticality threshold value, by the proactive replacer, performing an immediate full copy of data of the disk volume relating to the disk drive with the disk failure probability value above the predefined probability value to a newly instantiated disk volume on another disk drive.

According to another aspect of the present invention, a system for avoiding an interruption of services for a multi-tier application based on a probability of a disk failure may be provided. The system may include one or more processors that perform the processing of the system. The system may include an assignment unit adapted for assigning a criticality factor value to a component of the multi-tier application and a prediction analyzer adapted for predicting a disk failure probability value for a disk drive of a disk volume accessed by the component.

Additionally, the system may include a proactive replacer adapted for, in response to the disk failure probability value being above a predefined probability value for the disk drive of the disk volume accessed by the component and the assigned criticality factor value of the component being below a predefined criticality threshold, marking the disk drive of the disk volume accessed by the component to be exchanged with another disk volume on another disk drive during a future maintenance cycle. Furthermore, the proactive replacer may also be adapted for, in response to the disk failure probability value being above the predefined probability value for the disk drive of the disk volume accessed by the component and the assigned criticality factor value of the component being equal to or above the predefined criticality threshold value, performing an immediate full copy of data of the disk volume relating to the disk drive with the disk failure probability value above the predefined probability value to a newly instantiated disk volume on another disk drive.

Furthermore, embodiments may take the form of a related computer program product, accessible from a computer usable or computer readable storage medium providing program code for use, by or in connection with a computer or any instruction execution system. A computer usable or computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

BRIEF DESCRIPTION OF THE DRAWINGS

It should be noted that embodiments of the invention are described with reference to different subject-matters. In particular, some embodiments are described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
Figure 1:
Figure 1:
Figure 1:

Preferred embodiments of the invention will be described, by way of example only, and with reference to the following drawings:

FIG. 1 shows a block diagram of an embodiment of the inventive method for avoiding an interruption of services for a multi-tier application based on a probability of a disk failure.

Figure 2:
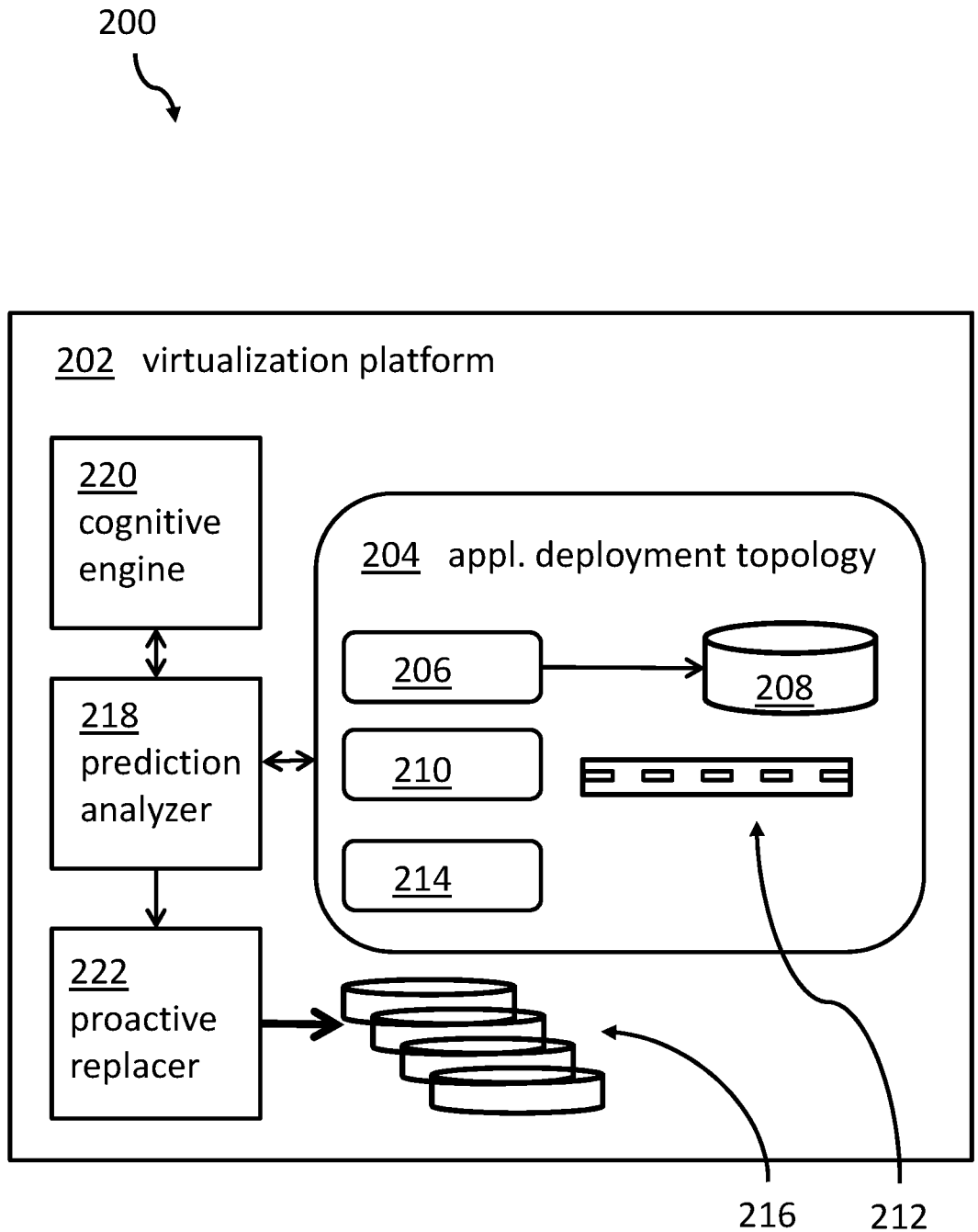

FIG. 2 shows a block diagram of an embodiment of a virtualization platform.

Figure 3:
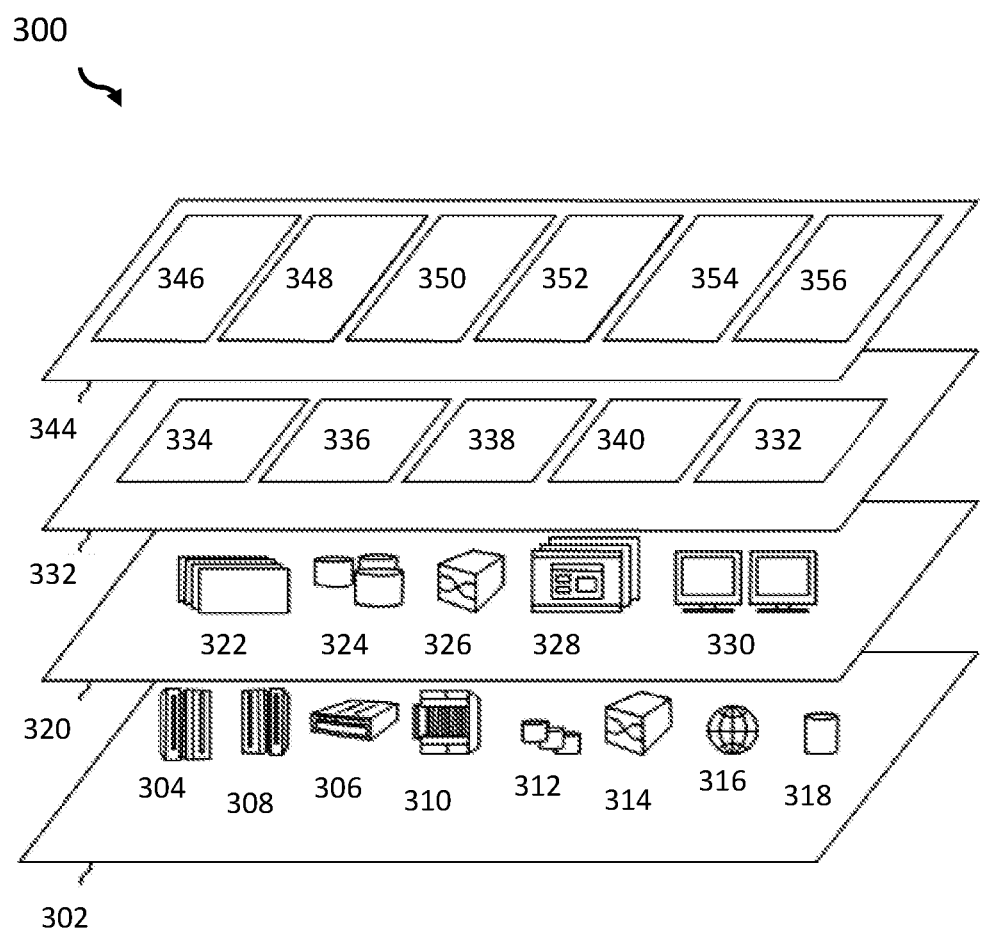

FIG. 3 shows a cloud computing environment in which at least parts of the inventive concept may be deployed.

Figure 4:
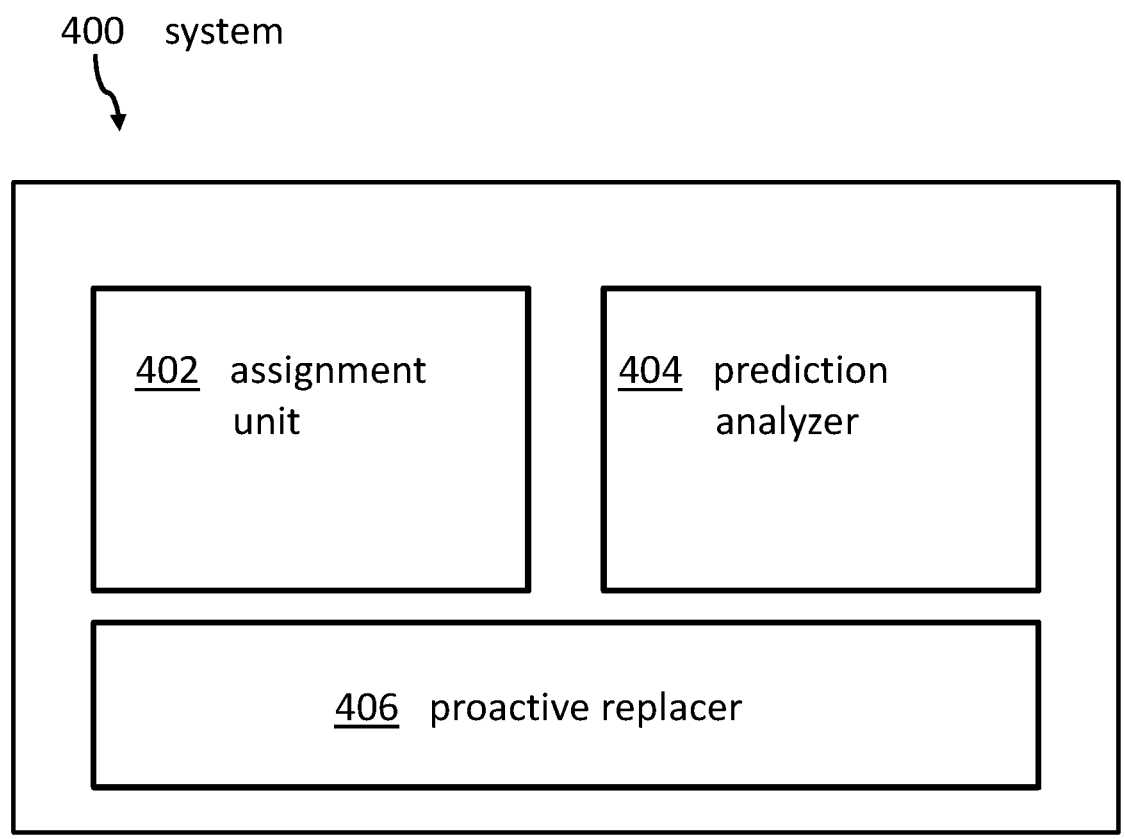

FIG. 4 shows a block diagram of an embodiment of a coarse grained block diagram of the system for avoiding an interruption of services.

Figure 5:
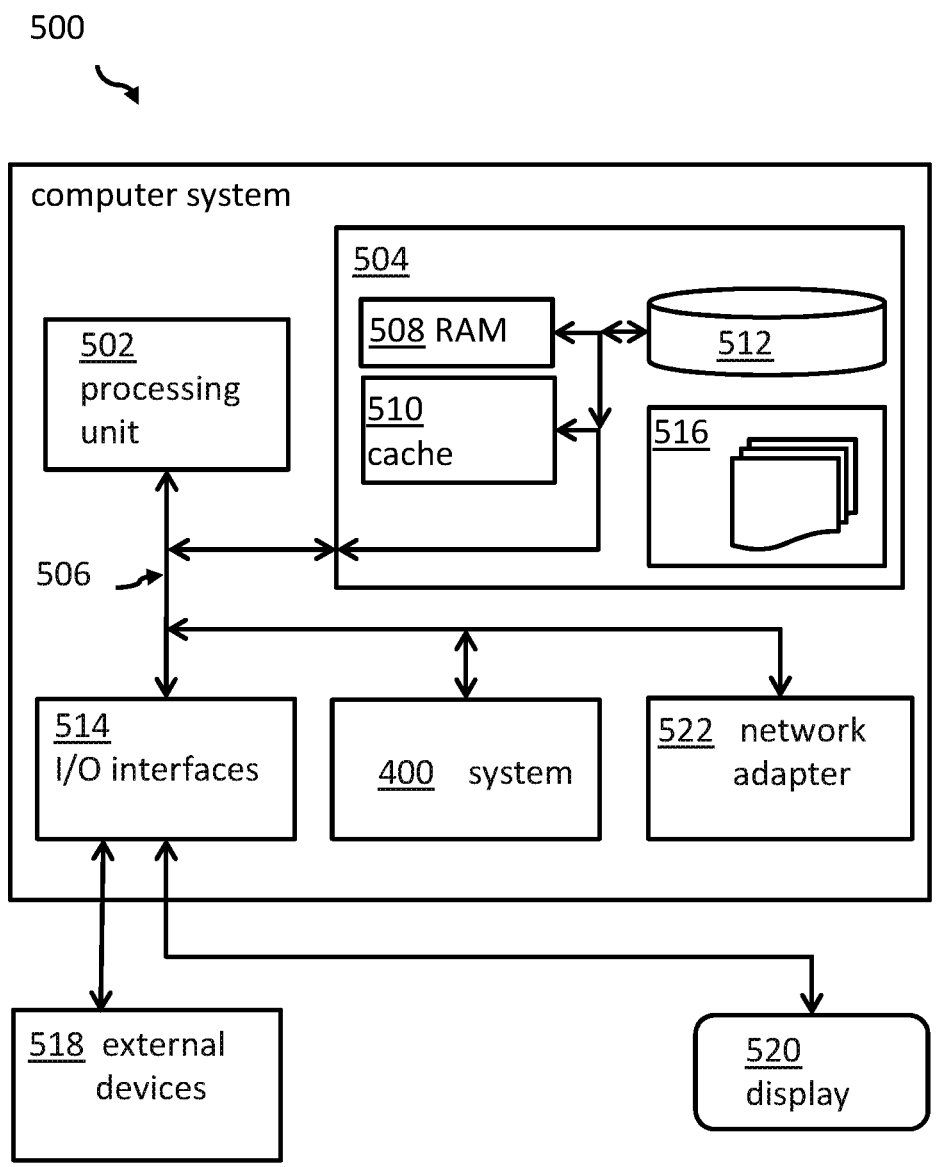

FIG. 5 shows an embodiment of a computing system comprising the system according to FIG. 4.

DETAILED DESCRIPTION

In the context of this description, the following conventions, terms and/or expressions may be used:

The term "interruption of services" may denote that a specific service, micro-service, application, or a part thereof, may no longer be available because the service, micro-service, application, or the part thereof, may have to access a disk drive which may experience a hardware failure, i.e., a disk drive failure.

The term "multi-tier application" may denote an application composed of a plurality of services—in the sense of a service-oriented application—which may depend on each other to deliver the complete functionality of the application. Instead of being composed of services, the application may also be composed of a mixture of services and micro-services. Only some of the services may need to access a hard drive.

The term "disk failure" may denote a hardware disk and/or its availability due to a variety of reasons. The disk drive may be broken physically—e.g., a head crash. But also other alternatives may lead to an interruption of the availability of the disk drive, like a broken cable, a defect controller, an error in the storage network or similar. However, the focus of the technology described herein is on a physical failure of the disk drive itself, although for purposes of the description herein it does not matter for which reason the disk drive is not available.

The term "prediction analyzer" may denote a hardware and/or software component, or a mixture thereof, enabled to predict a probability for a failure of a physical disk storage system, in particular an individual disk drive.

The term "criticality factor value" may denote a numerical value—hence, criticality factor value—being assigned to an application or part thereof (a service, a micro-service, a subroutine, etc.). The criticality factor may denote a measure for the requirement of continuous availability of the application. Thus, also services and/or micro-services may have assigned criticality factor values. This may be advantageous if a service or micro-service may be used by a plurality of different applications and/or from other services. In a simple form, the criticality factor may have two values: "critical" or "non-critical."

The term "hypervisor" or virtual machine monitor (VM or VMM) may denote computer software, firmware and/or hardware that may create and run virtual machines. A computer system, on which a hypervisor may run one or more virtual machines, may be called a host machine, and each virtual machine may be called a guest machine. The hypervisor may present the guest operating systems with a virtual operating platform and may manage the execution of the guest operating systems and software applications. Multiple instances of a variety of operating systems may share the virtualized hardware resources. The same concept may be implemented for a network infrastructure as well as for a storage infrastructure. In this case, virtual storage volumes may be accessed by the (real) applications.

The term "disk volume" or logical drive may denote a single accessible storage area with a single file system, typically (though not necessarily) resident on a single partition of a hard disk. Although a storage volume might be different from a physical disk drive, it may still be accessed with an operating system's logical interface. However, a storage volume may differ from a partition, and a volume may span more than one disk drive.

The term "disk drive" may denote a disk storage (also sometimes called the drive storage) and it may be a general category of storage mechanisms, where data are recorded by various electronic, magnetic, optical, or mechanical changes to a surface layer of one or more rotating disks. A disk drive may be a device implementing such a storage mechanism. Notable types are the hard disk drive (HDD) comprising a non-removable disk, the floppy disk drive (FDD) and its removable floppy disk, and various optical disc drives (ODD) and associated optical disc media. It may be noted that the focus of the proposed method is on hard disk drives. However, the method and the related system may also be used for solid-state drives SSDs, solid magnetic memories or memristors. Also those drives with no spinning disks have a certain probability of failure, i.e., MTBF (Mean Time Between Failures).

The term "immediate full copy" may denote a process of copying a complete content of one physical disk drive to another physical disk drive. A larger (or smaller) logical storage volume may not be affected because the storage virtualization may take care for assigning the new physical disk drive to the logical storage volume.

The term "virtualization" may refer to the act of creating a virtual (rather than actual) version of something, including virtual computer hardware platforms, storage devices, and computer network resources. Thus, there may be a separation between actual physical devices—in particular disk drives—and higher layers which only experience lower layers in a simulated, i.e., virtualized form.

The term "future maintenance cycle" may denote a future time period dedicated to perform maintenance tasks to a data center environment. This may include computing systems, the air condition system, tape drives, as well as, disk drives and network devices.

The term "virtual disk" may denote instantiated in a virtualized computing environment. The virtual disk may be managed via a hypervisor. An application may access the virtual disk or disk volume via the hypervisor.

The term "logical array" may denote a plurality of virtual disk drives also denoted as disk or storage volumes. Each storage volume may manage a virtual filesystem.

The term "initial risk factor" may denote a risk factor determined in a first determination step of the proposed method. This initial risk factor may be used as an input to a cognitive computing function to determine a final risk factor for a failure of a disk drive.

The term "cognitive computing system" may denote any artificial intelligence, machine learning engine or deep learning engine suitable to be trained and enabled to predict a disk drive failure based on an initial risk factor and potentially reflecting parameters provided by the disk drive.

The term "cloud computing" may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five characteristics, three service models and four deployment models.

Characteristics of cloud computing are as follows:

On-demand self-service. A consumer can unilaterally provision computing capabilities, such as server time and network storage, as needed automatically without requiring human interaction with each service provider.

Broad network access. Capabilities are available over the network and accessed through standard mechanisms that promote use by heterogeneous thin or thick client platforms (e.g., mobile phones, laptops, and PDAs).

Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud Computing used are as follows:

Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing are as follows:

Private cloud. The cloud infrastructure is operated solely by an organization. It may be managed by the organization or a third party and may exist on premise or off premise.

Community cloud. The cloud infrastructure is shared by several organizations and supports a specific community that has shared concerns (e.g., mission, security requirements, policy, and compliance considerations). It may be managed by the organizations or a third party and may exist on premise or off premise.

Public cloud. The cloud infrastructure is made available to the general public or a large industry group and is owned by an organization selling cloud services.

Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

The subject matter described herein for avoiding an interruption of services for a multi-tier application and preventing disk hardware failure for cloud applications is based upon a probability of a disk failure that may offer multiple advantages and technical effects.

The problem arises with respect to how disk hardware failures may be prevented and how to determine which nodes should be configured in a highly-availability manner. Moreover, where a high-availability topology is not supported by an application, it would be valuable to know which storage volume may have a higher probability to experience a hardware failure of an underlying disk drive, and to put in place proactive actions to avoid an interruption of services and to minimize the required maintenance windows.

Out of service situations for applications or parts thereof may be reduced significantly and/or avoided completely according to the description herein. The technology described herein provides a feature of linking an application or service to a specific disk even where a virtualization concept may be in place (e.g., particular, hardware virtualization, network virtualization and/or storage virtualization), and thereby represents a significant difference to traditional virtualization environments. It should be noted that one of the objectives of virtualization is to make different layers of architecture independent from each other. Thus, in traditional virtualization approaches a link between an upper level element (e.g., an application) and a lowest level element (e.g., a particular a disk) would be contra-productive.

However, the approach of linking an application to a disk in a virtualized computing and/or network and/or storage environment described herein may allow for predicting an outage of the application where a probability for a disk failure may be determined. Hence, if a probability for a disk failure may be determined, proactive actions may be taken in order to guarantee a continued operation of the application. This may be an important differentiating feature of a cloud computing data center. For this purpose, it may be also advantageous to classify applications as critical or noncritical, or with any criticality value specified between different applications. If the criticality value of an application, or a part thereof, may be combined with the probability of a disk failure, the reliability of the virtualized computing environment may be enhanced significantly.

The technology described herein may also reduce maintenance cycles and unplanned downtimes. In the following, a plurality of additional alternative technical aspects are described. It is understood that these alternatives may be implemented as appropriate for a given implementation of the technology described herein.

For example, the criticality factor value may be selected out of the values "non-critical" and "critical." These may be the two basic values for the criticality factor. However, to provide a more fine-grained control of the technical processing described herein, the criticality factor values may be implemented with additional dependencies and/or conditions.

In such an implementation, the assignment of the criticality factor may be dependent on at least one condition selected out of the group consisting of (a) whether the component persists data, (b) whether a resource queue managed by the multi-tier application is recoverable from other components of the multi-tier application, and (c) an availability importance factor of the multi-tier application in case of a data loss. These conditions may represent circumstances in which a direct link from an application component to a physical disk drive is instrumental in ensuring a continuous availability of the application and/or the application component, respectively. The last named conditions, in particular condition (c), may be interpreted as a business criticality of business impact in case of a data loss.

An application may be composed of several services and/or micro-service being deployed using a hypervisor accessing a plurality of physical computing systems and/or a plurality of physical disk drives. It may be noted that the access to the physical disk drive(s) may be performed via logical disk volumes.

An immediate full copy also may include creating a new virtual disk on a different logical array of physical disks than a logical array currently used for the disk volume. Thus, the data copy may be performed from one logical disk to another logical disk to which different physical disk drives may be related.

An initial risk factor for predicting the disk failure may be determined by the following Equation (1):

$$\text{risk\_factor}_{int} = f1(RSC) + f2(RSE) + f3(SKE) + f4(SRC) + f5(ADD)$$

Within Equation (1), RSC may be a Reallocated Sector Count of a disk, RSE may be a Read Error Rate of a disk, SKE may be a Seek Error Rate of a disk, SRC may be a Spin Retry Count of a disk, and ADD may be an Age of Disk Drive of a disk. The elements f1, f2, f3, f4, and f5 may be scaling factors. The parameters of the continued operation of a disk drive (e.g., RSC, etc.) are considered to be known measurable parameter values that may either be provided by the disk drive itself, a related driver, a hypervisor, or an operating system component. The scaling factors may be selected individually and may be based on experimental results.

As another alternative, the disk failure probability value may be determined by the following Equation (2):

$$P_{disk\_failure} = F_{cognitive}(\text{risk\_factor}_{int})$$

Within Equation (2), $F_{cognitive}$ may be a function of a cognitive computing system. A variety of different cognitive computing systems, including deep learning and machine learning algorithms, may be used and may reflect a statistical analysis of historical data and a time based pattern development of the above-referenced parameters of a disk drive.

As another alternative, the marking of the disk may also include performing a full copy of data to a newly instantiated disk volume and invoking a virtualization manager to configure a virtual machine relating to the component to use the newly instantiated disk volume. However, in this case, the full copy may optionally not be generated immediately and may be delayed to the nearest maintenance window. This may reflect a lower priority case compared to a component that may be marked as "critical."

Performing an immediate full copy may alternatively be performed by invoking the virtualization manager to configure a virtual machine relating to the component to use the newly instantiated disk volume, thereby reflecting effects of ongoing transactions and potential roll-back requirements. Hence, in the case of a "critical" component being involved in a failure of a disk drive, a more complex procedure may be followed to guarantee ongoing transaction consistency.

In the following, a detailed description of the figures will be provided. All instructions in the figures are schematic. First, a block diagram of an embodiment of the inventive method for avoiding an interruption of services for a multi-tier application based on a probability of a disk failure is provided. Afterwards, further embodiments, as well as embodiments of the system for avoiding an interruption of services for a multi-tier application based on a probability of a disk failure, will be described.

FIG. 1 shows a block diagram of a method 100 for avoiding an interruption of services for a multi-tier application based on a probability of a disk failure. At 102, the method 100 includes assigning a criticality factor value to at least one component of the multi-tier application. As described above, the criticality factor value may be selected out of the values "critical" and "non-critical." Other implementations may use a more fine-grained criticality factor model.

At 104, the method 100 further includes predicting a disk failure probability (value) for a disk drive (i.e., a real physical disk drive of a disk volume accessed by the component). The access may be performed via a virtualization layer, such as a hypervisor from the application or the application component to the disk. The prediction may be done by a prediction analyzer or a virtual disk failure prediction analyzer, or otherwise as appropriate for a given implementation.

At 106, the method 100 includes further, upon the disk failure probability being a predefined probability value for the disk drive of the disk volume accessed by the component having an assigned criticality factor value below a predefined criticality threshold value (e.g., in a "non-critical" case,") by a proactive replacer, marking the disk drive of the disk volume accessed by the component to be exchanged by another disk volume on another disk drive or a disk array, respectively, during a future maintenance cycle. Thus, the exchange of the disk drive may be planned for the next down time of the related computer system. However, the exchange may also be scheduled for the maintenance windows after the next maintenance window or any other selected time in the future.

At 108, the method 100 may include, upon the disk failure probability being above a predefined probability value for the disk drive of the disk volume accessed by the component having an assigned criticality factor value equal or above the predefined criticality threshold value (e.g., the "critical" case) by the proactive replacer, performing an immediate full copy of the disk volume relating to the disk drive having the disk failure probability above the predetermined disk failure probability to a newly instantiated (e.g., virtual) disk volume on another disk drive or a disk array, respectively, to avoid an interruption of services based on the probability of disk hardware failure.

FIG. 2 shows a block diagram 200 of a system of a virtualization platform 202 instrumental for a deployment of the technology described herein. An application deployment topology 202 may include a plurality of software components 206, 210, 214 for performing different tasks. For example, the application component 206 may manage a re-creatable resource queue 208. Because of the resource queue is re-creatable, the application component 206 may be categorized as "non-critical." Another application component 210 may manage configuration management data 212. In this case, the application component 210 may be categorized as "critical" because these data may not be re-created in case of a disk drive failure. If, however, the application component 210 may manage alternatively a self-consistent resource queue, the application component 210 may be categorized as "non-critical." There may be also other application components, such as in the case of the application component 214 that are not currently tasked with managing resources. Therefore, application components of this type may be categorized as "non-critical."

An underlying storage system 216 may include multiple (e.g., one or more) areas of physical disks that may be linked to the application or the application components, respectively, via the virtualization platform 202, which may also include a hypervisor (not shown).

It may also be noted that a prediction analyzer 218 may monitor the application components of the given application deployment topology 204 and may perform the prediction about hardware failures of disk drives of the underlying storage system 216, as described. The prediction analyzer 218 may cooperate with a trained cognitive engine 220 for forecasting disk hardware failures based on the disk drive parameters, as mentioned above.

A proactive replacer 222 differentiates between "critical" and "non-critical" components 206, 210, 214 and performs an immediate full copy of the disk drive expected to fail, or marks a soon to fail disk drive for a replacement during the next maintenance window.

FIG. 3 shows a cloud computing environment 300 in which at least parts of the inventive concept may be deployed. A set of functional abstraction layers provided by a cloud computing environment is shown. It should be understood in advance that the components, layers, and functions shown in FIG. 3 are intended to be only illustrative and embodiments of the invention are not limited thereto. As depicted, the following layers and corresponding functions are provided: hardware and software layers 302 include hardware and software components. Examples of hardware components include: mainframes 304; servers 306; RISC (Reduced Instruction Set Computer) architecture-based servers 308; blade servers 310; storage devices 312; networks 314 and networking components 314. In some embodiments, software components include network application server software 316 and/or database software 318.

A virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 332 may provide the functions described below. Resource provisioning 334 provides dynamic procurement of computing resources and other resources that are utilized to perform tasks within the cloud computing environment. Metering and pricing 336 provide cost tracking as resources are utilized within the cloud computing environment, and billing or invoicing for consumption of these resources. In one example, these resources may comprise application software licenses. Security provides identity verification for cloud consumers and tasks as well as protection for data and other resources. User portal 338 provides access to the cloud computing environment for consumers and system administrators. Service level management 340 provides cloud computing resource allocation and management such that required service levels are met. Service Level Agreement (SLA) planning and fulfillment 342 provides pre-arrangement for, and procurement of, cloud computing resources for which a future requirement is anticipated in accordance with an SLA.

Workload layer 344 provides examples of functionality for which the cloud computing environment may be utilized. Examples of workloads and functions which may be provided from this layer include: mapping and navigation 346; software development and lifecycle management 348; virtual classroom education delivery 350; data analytics processing 352; transaction processing 354; and the system for avoiding an interruption of services and preventing disk hardware failure for cloud applications 356.

FIG. 4 shows a block diagram of a system 400 for avoiding an interruption of services. The system 400 includes an assignment unit 402 adapted for assigning a criticality factor value to at least one component of the multi-tier application. A prediction analyzer 404 is adapted for predicting a disk failure probability (value) for a disk drive of a disk volume accessed by the component.

The system 400 also includes a proactive replacer 406 adapted for, in response to the disk failure probability being above a predefined probability value for the disk drive of the disk volume accessed by the component having an assigned criticality factor value below a predefined criticality threshold value, marking the disk drive of the disk volume accessed by the component to be exchanged by another disk volume on another disk drive during a future maintenance cycle.

The proactive replacer 406 is also adapted for, in response to the disk failure probability being above a predefined probability value for the disk drive of the disk volume accessed by the component having an assigned criticality factor value, equal or above the predefined criticality threshold value, performing an immediate full copy of the disk volume relating to the disk drive having the disk failure probability above the predetermined disk failure probability to a newly instantiated disk volume on another disk drive to avoid an interruption of services based on the probability of disk hardware failure.

Embodiments of the invention may be implemented together with virtually any type of computer, regardless of the platform being suitable for storing and/or executing program code.

FIG. 5 shows, as an example, a computing system 500 suitable for executing program code related to the proposed method. The computing system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the system 400 for avoiding an interruption of services for a multi-tier application based on a probability of a disk failure may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a," "an," and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for avoiding an interruption of services for a multi-tier application based on a probability of a disk failure, the method comprising:
by at least one processor:
directly linking a disk drive to the multi-tier application or a component of the multi-tier application;
assigning a criticality factor value to the component of the multi-tier application, the criticality factor denoting a measure of a requirement for continuous availability of the multi-tier application;
predicting a disk failure probability value for the disk drive of a disk volume accessed by the component using a trained cognitive engine cooperating with a prediction analyzer to forecast hardware failures of the disk drive based on disk drive parameters comprising Reallocated Sector Count (RSC), Read Error Rate (RER), Seek Error Rate (SKE), Spin Retry Count (SRC) and Age of Disk Drive (ADD);
in response to the disk failure probability value being above a predefined probability value for the disk drive of the disk volume accessed by the component and the assigned criticality factor value of the component being below a predefined criticality threshold value, marking the disk drive of the disk volume accessed by the component to be exchanged with another disk volume on another disk drive during a future maintenance cycle; and
in response to the disk failure probability value being above the predefined probability value for the disk drive of the disk volume accessed by the component and the assigned criticality factor value of the component being equal to or above the predefined criticality threshold value, performing an immediate full copy of data of the disk volume relating to the disk drive with the disk failure probability value above the predefined probability value to a newly instantiated disk volume on another disk drive.

2. The method of claim 1, where the criticality factor value is selected from a set of values consisting of "non-critical" and "critical."

3. The method of claim 1, where the assignment of the criticality factor value is dependent on at least one condition selected from a group of conditions consisting of:
whether the component persists data;
whether a resource queue managed by the multi-tier application is recoverable from other components of the multi-tier application; and
an availability importance factor of the multi-tier application in case of a data loss.

4. The method of claim 1, where the multi-tier application is composed of several services and/or micro-services that are deployed using a hypervisor that accesses a plurality of physical computing systems and/or a plurality of physical disk drives.

5. The method of claim 1, where performing the immediate full copy of the data of the disk volume further comprises the at least one processor:
creating a new virtual disk on a different logical array of physical disks than a logical array of physical disks associated with the disk drive of the disk volume accessed by the component.

6. The method of claim 1, further comprising the at least one processor determining an initial risk factor for predicting a failure of the disk drive of the disk volume accessed by the component according to:

$$\text{risk\_factor}_{int} = f1(RSC) + f2(RSE) + f3(SKE) + f4(SRC) + f5(ADD);$$

where:
RSC comprises a Reallocated Sector Count value of the disk drive;
RSE comprises a Read Error Rate value of the disk drive;
SKE comprises a Seek Error Rate value of the disk drive;
SRC comprises a Spin Retry Count value of the disk drive; and
ADD comprises an Age of Disk Drive value of the disk drive; and
where f1, f2, f3, f4, and f5 are scaling factors.

7. The method of claim 6, where predicting the disk failure probability value for the disk drive of the disk volume comprises the at least one processor determining the disk failure probability value according to:

$$P_{disk\_failure} = F_{cognitive}(\text{risk\_factor}_{int}), \text{ where}$$

$F_{cognitive}$ comprises a function of a cognitive computing system.

8. The method of claim 1, where marking the disk drive further comprises the at least one processor:
performing the full copy of the data of the disk volume to the newly instantiated disk volume; and
invoking a virtualization manager to configure a virtual machine relating to the component to use the newly instantiated disk volume.

9. The method of claim 1, where performing the immediate full copy of the data of the disk volume further comprises the at least one processor:
invoking a virtualization manager to configure a virtual machine relating to the component to use the newly instantiated disk volume, thereby reflecting effects of ongoing transactions and potential roll-back requirements.

10. A system for avoiding an interruption of services for a multi-tier application based on a probability of a disk failure, the system comprising:
a memory
a disk drive; and
at least one processor programmed to:
directly link the disk drive to the multi-tier application or a component of the multi-tier application;
assign a criticality factor value to the component of the multi-tier application, the criticality factor denoting a measure of a requirement for continuous availability of the multi-tier application;
predict a disk failure probability value for the disk drive of a disk volume accessed by the component using a trained cognitive engine cooperating with a prediction analyzer to forecast hardware failures of the disk drive based on disk drive parameters comprising Reallocated Sector Count (RSC), Read Error Rate (RER), Seek Error Rate (SKE), Spin Retry Count (SRC) and Age of Disk Drive (ADD);
in response to the disk failure probability value being above a predefined probability value for the disk drive of the disk volume accessed by the component and the assigned criticality factor value of the component being below a predefined criticality threshold value, mark the disk drive of the disk volume accessed by the component to be exchanged with another disk volume on another disk drive during a future maintenance cycle; and in response to the disk failure probability value being above the predefined probability value for the disk drive of the disk volume accessed by the component and the assigned criticality factor value of the component being equal to or above the predefined criticality threshold value, perform an immediate full copy of data of the disk volume relating to the disk drive with the disk failure probability value above the predefined probability value to a newly instantiated disk volume on another disk drive.

11. The system of claim 10, where the criticality factor value is selected from a set of values consisting of "non-critical" and "critical."

12. The system of claim 10, where the assignment of the criticality factor value is dependent on at least one condition selected from a group of conditions consisting of:
whether the component persists data;
whether a resource queue managed by the multi-tier application is recoverable from other components of the multi-tier application; and
an availability importance factor of the multi-tier application in case of a data loss.

13. The system of claim 10, where the multi-tier application is composed of several services and/or micro-services that are deployed using a hypervisor that accesses a plurality of physical computing systems and/or a plurality of physical disk drives.

14. The system of claim 10, where, in being programmed to perform the immediate full copy of the data of the disk volume, the at least one processor is further programmed to:
create a new virtual disk on a different logical array of physical disks than a logical array of physical disks associated with the disk drive of the disk volume accessed by the component.

15. The system of claim 10, where the at least one processor is further programmed to determine an initial risk factor for predicting a failure of the disk drive of the disk volume accessed by the component according to:

$$\text{risk\_factor}_{init} = f1(RSC) + f2(RSE) + f3(SKE) + f4(SRC) + f5(ADD);$$

where:
RSC comprises a Reallocated Sector Count value of the disk drive;
RSE comprises a Read Error Rate value of the disk drive;
SKE comprises a Seek Error Rate value of the disk drive;
SRC comprises a Spin Retry Count value of the disk drive; and
ADD comprises an Age of Disk Drive value of the disk drive; and
where f1, f2, f3, f4, and f5 are scaling factors.

16. The system of claim 15, where, in being programmed to predict the disk failure probability value for the disk drive of the disk volume, the at least one processor is programmed to determine the disk failure probability value according to:

$$P_{disk\_failure} = F_{cognitive}(\text{risk\_factor}_{init}), \text{ where}$$

$F_{cognitive}$ comprises a function of a cognitive computing system.

17. The system of claim 10, where, in being programmed to mark the disk drive, the at least one processor is further programmed to:
perform the full copy of the data of the disk volume to the newly instantiated disk volume; and
invoke a virtualization manager to configure a virtual machine relating to the component to use the newly instantiated disk volume.

18. The system of claim 10, where, in being programmed to perform the immediate full copy of the data of the disk volume, the at least one processor is further programmed to:
invoke a virtualization manager to configure a virtual machine relating to the component to use the newly instantiated disk volume, thereby reflecting effects of ongoing transactions and potential roll-back requirements.

19. A computer program product for avoiding an interruption of services for a multi-tier application based on a probability of a disk failure, the computer program product comprising a computer readable storage medium having program instructions embodied therewith, where the computer readable storage medium is not a transitory signal per se and where the program instructions when executed by one or more computing systems to cause the one or more computing systems to:
directly link a disk drive to the multi-tier application or a component of the multi-tier application;
assign a criticality factor value to the component of the multi-tier application, the criticality factor denoting a measure of a requirement for continuous availability of the multi-tier application;
predict a disk failure probability value for the disk drive of a disk volume accessed by the component using a trained cognitive engine cooperating with a prediction analyzer to forecast hardware failures of the disk drive based on disk drive parameters comprising Reallocated Sector Count (RSC), Read Error Rate (RER), Seek Error Rate (SKE), Spin Retry Count (SRC) and Age of Disk Drive (ADD);
in response to the disk failure probability value being above a predefined probability value for the disk drive of the disk volume accessed by the component and the assigned criticality factor value of the component being below a predefined criticality threshold value, mark the disk drive of the disk volume accessed by the component to be exchanged with another disk volume on another disk drive during a future maintenance cycle; and
in response to the disk failure probability value being above the predefined probability value for the disk drive of the disk volume accessed by the component and the assigned criticality factor value of the component being equal to or above the predefined criticality threshold value, perform an immediate full copy of data of the disk volume relating to the disk drive with the disk failure probability value above the predefined probability value to a newly instantiated disk volume on another disk drive.

* * * * *